US006792691B2

United States Patent
Genal et al.

(10) Patent No.: US 6,792,691 B2
(45) Date of Patent: Sep. 21, 2004

(54) GAGE FOR MILLED BLADE RING SEGMENTS

(75) Inventors: Shawn Gregory Genal, Simpsonville, SC (US); James Philip Stanley, Pickens, SC (US); Lynn Charles Gagne, Simpsonville, SC (US); Stewart William Beitz, Greenville, SC (US)

(73) Assignee: General Electric Company, Schenectady, NY (US)

( * ) Notice: Subject to any disclaimer, the term of this patent is extended or adjusted under 35 U.S.C. 154(b) by 16 days.

(21) Appl. No.: 10/291,830

(22) Filed: Nov. 12, 2002

(65) Prior Publication Data

US 2004/0088876 A1 May 13, 2004

(51) Int. Cl.⁷ .................................................. G01B 5/00
(52) U.S. Cl. .............................. 33/833; 33/533; 33/555; 33/613; 83/522.16
(58) Field of Search ................... 33/832–833, 530–534, 33/613, 645, 626–628, 633, 549, 551, 555; 30/233; 83/435.14, 522.18

(56) References Cited

U.S. PATENT DOCUMENTS

| 2,560,571 A | * | 7/1951 | Hawkins ........................ 33/833 |
| 3,848,339 A | * | 11/1974 | Strasbaugh ................... 33/507 |
| 4,142,295 A | * | 3/1979 | Nishina et al. ............... 33/559 |
| 4,450,628 A | * | 5/1984 | Rocks ........................... 33/833 |
| 4,642,901 A | * | 2/1987 | Webb ............................ 33/530 |
| 4,674,190 A | * | 6/1987 | Tusinski et al. ............... 33/507 |
| 4,718,172 A | * | 1/1988 | Rouse et al. .................. 33/530 |
| 5,131,814 A | | 7/1992 | Przytulski et al. |
| 5,133,135 A | * | 7/1992 | Durfee, Jr. .................... 33/534 |
| 5,235,756 A | * | 8/1993 | Wickenhaver ............... 33/834 |
| 5,410,818 A | * | 5/1995 | Chalk .......................... 33/833 |
| 5,456,017 A | * | 10/1995 | Meier .......................... 33/572 |
| 5,713,721 A | | 2/1998 | Glynn et al. |
| 5,768,798 A | * | 6/1998 | Takahashi et al. ............ 33/784 |
| 6,217,283 B1 | | 4/2001 | Ravenhall et al. |
| 6,397,486 B1 | * | 6/2002 | Keys et al. .................... 33/522 |
| 6,408,532 B1 | * | 6/2002 | Keys et al. .................... 33/833 |

FOREIGN PATENT DOCUMENTS

| DE | 3515129 | 10/1986 |
| GB | 260193 | 10/1926 |

* cited by examiner

Primary Examiner—Diego Gutierrez
Assistant Examiner—Yaritza Guadalupe
(74) Attorney, Agent, or Firm—Nixon & Vanderhye P.C.

(57) ABSTRACT

A gage assembly for measuring a distance d from an end edge of a blade segment to a center location of a groove formed in the segment comprising a gage body having at least two reference surfaces adapted to engage edges of the segment; a dial indicator gage having a dial and a stem, the stem passing through a portion of the gage body; and a slide gage adapted for insertion into the groove, the slide gage fitted with an element that, in use, aligns with the stem of the dial indicator gage.

10 Claims, 2 Drawing Sheets

GAGE FOR MILLED BLADE RING SEGMENTS

BACKGROUND OF THE INVENTION

This invention relates to a measurement device for use in the milling of compressor blade ring segments.

Compressor stator blades are typically seated in a plurality of arcuate segments that combine to form an annular ring of segments each containing a plurality of blades. The blades are typically secured to the segments with a dovetail arrangement wherein a male dovetail formed at the base of the blade is slidably received within a dovetail slot in the segment. The dovetail grooves in the segments may be formed by a milling process, but the fixturing required to hold the segment does not insure that a particular reference point can be consistently and repeatably achieved. This reference point is measured from the end edge of the segment to the center of the first dovetail groove in the segment. This reference point must be accurate for each segment in order to insure the proper spacing of blades for the specific stage in the compressor of the turbine. If the spacing is incorrect, turbulent air flow could occur resulting in decreased efficiency of the turbine.

BRIEF DESCRIPTION OF THE INVENTION

The present invention provides a manual gage assembly that verifies the consistency of the machine and the fixture while running production parts. In the exemplary embodiment, the gage assembly includes a gage body incorporating a conventional dial indicator gage that works in combination with a slide gage designed to be received in the first dovetail slot formed in the segment. The gage body includes a sloped edge that corresponds generally to the sloped edge of the dovetail groove, along with an interior right side edge that is adapted to engage the right side edge of the segment. The dial indicator is supported in the body, with the stem of the indicator passing through a bore in the gage body and opening along the sloped surface. The slide gage component is dimensioned to fit snugly in the dovetail groove, and a fixed pin is centered on the slide gage such that the pin will lie on a longitudinal center line of the dovetail groove when the slide gage is installed in the groove. The pin is also located so as to be centered between the side edges of the segment. With the slide gage inserted into the slot, the gage body is then located on the segment such that the body is engaged with a top surface of the segment and along a right side edge of the segment. With the slide gage so located, the stem of the dial indicator will engage the fixed pin on the slide gage and will measure the distance from the top or end edge of the segment to the center of the dovetail slot. This measurement is often referred to as the "point zero" dimension and is used as the reference dimension for milling all of the other dovetail grooves within the segment.

Accordingly, in one exemplary embodiment, the invention relates to a gage assembly for measuring a distance (d) from an end edge of a blade segment to a center location of a groove formed in the segment comprising a gage body having at least two reference surfaces adapted to engage edges of the segment; a dial indicator gage having a dial and a stem, the stem passing through a portion of the gage body; and a slide gage adapted for insertion into the groove, the slide gage fitted with an element that, in use, aligns with the stem of the dial indicator gage.

In another aspect, the invention relates to a gage assembly for measuring a distance (d) from an edge of a blade segment to a center location of a groove formed in the blade segment comprising a gage body having at least two reference surfaces adapted to engage edge surfaces of the segment and a sloped edge configured to match a corresponding angled edge of the groove; a dial indicator gage having a dial and a stem, the stem passing through a portion of the gage body and opening through the sloped edge; and a slide gage adapted for insertion into the groove, the slide gage fitted with an element that, in use, aligns with the stem of the dial indicator gage; wherein one of the reference surfaces comprises a pin, and the other of the reference surfaces comprises a beveled surface extending along a side edge of the gage body.

The invention will now be described in detail in connection with the drawings identified below.

DETAILED DESCRIPTION OF THE INVENTION

Figure 1:
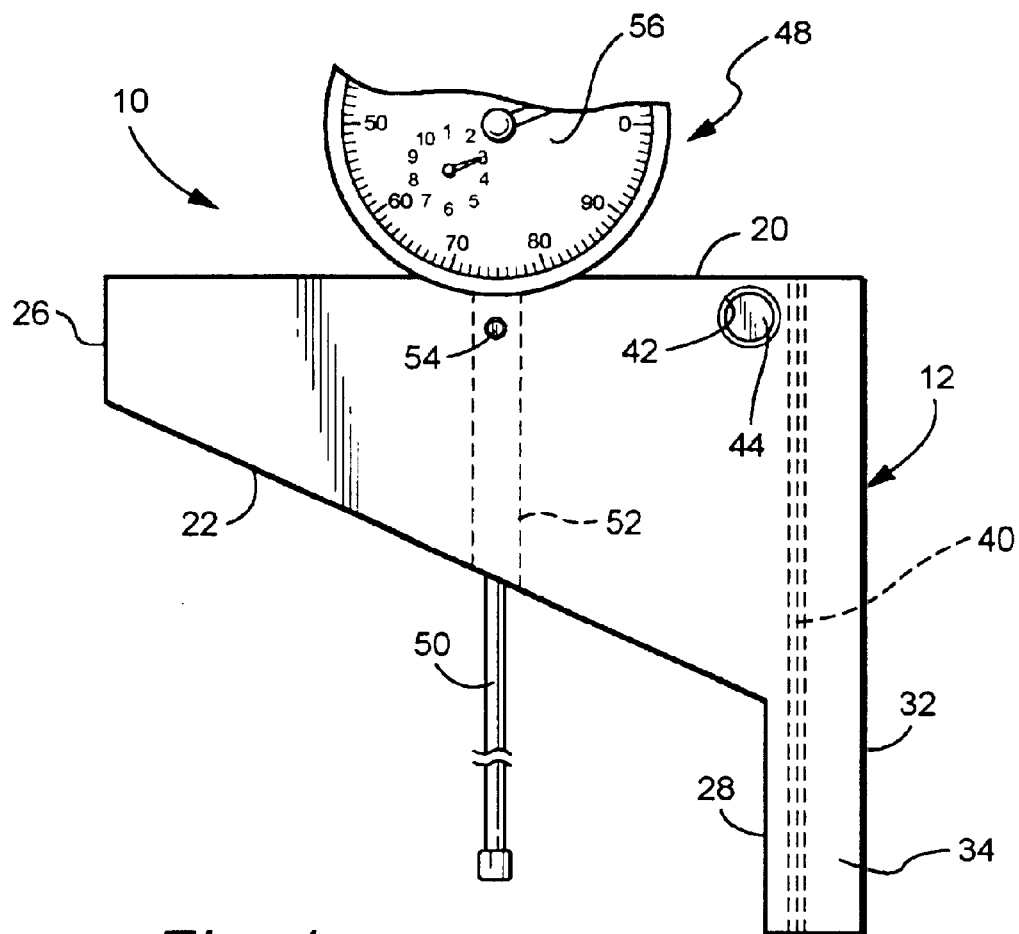
FIG. 1 is a side elevation of a gage assembly in accordance with the invention.
Figure 2:
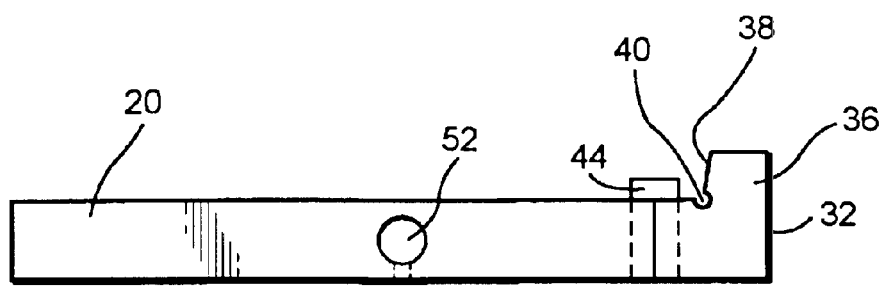
FIG. 2 is a top plan view of the gage assembly shown in FIG. 1, with a dial indicator component removed.
Figure 4:
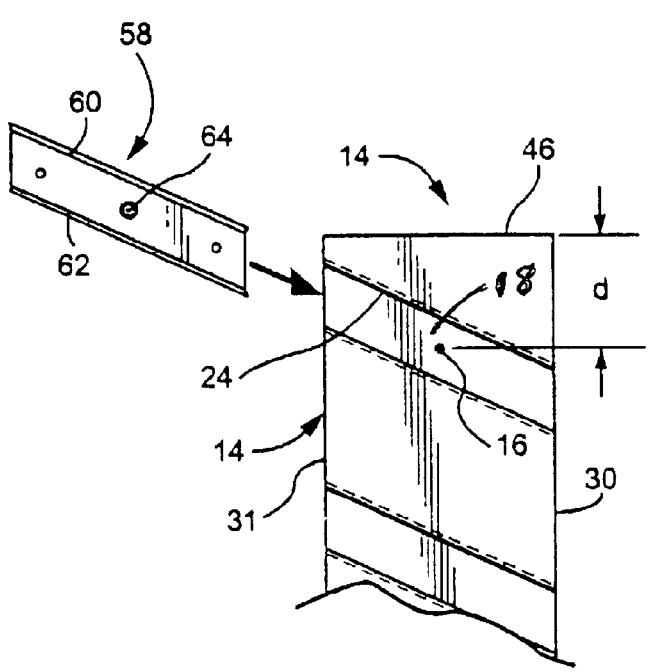
FIG. 4 is a plan view illustrating a blade segment and a slide gage component of the gage assembly in accordance with the invention.

With reference to FIGS. 1 and 2, a gage assembly 10 is shown for use in measuring the distance "d" between a top or end edge 12 of an accurate blade segment 14 to a center line location 16 of a first angled dovetail groove 18 in the arcuate blade segment 14 (see FIG. 4).

Note that references to a "top" edge and "right" or "left" side edges are used merely for clarity of the discussion herein and are based on the orientation of the gage assembly in the various drawing Figures. In addition, while the blade segment 14 is, in fact, arcuate, the curvature is not apparent from the relatively small portion of the segment shown in the drawings.

The gage assembly 10 includes a gage body 12 with a top edge 20, a sloped edge 22 that corresponds generally to the angled edge 24 of the dovetail groove 18 (FIG. 4), a left side edge 26, an interior right side edge 28 and an exterior right side edge 32. The sloped edge 22 joins to the interior right edge 28 forming a generally rectangular portion 34 that projects downwardly from the remainder of the body 12.

Figure 3:
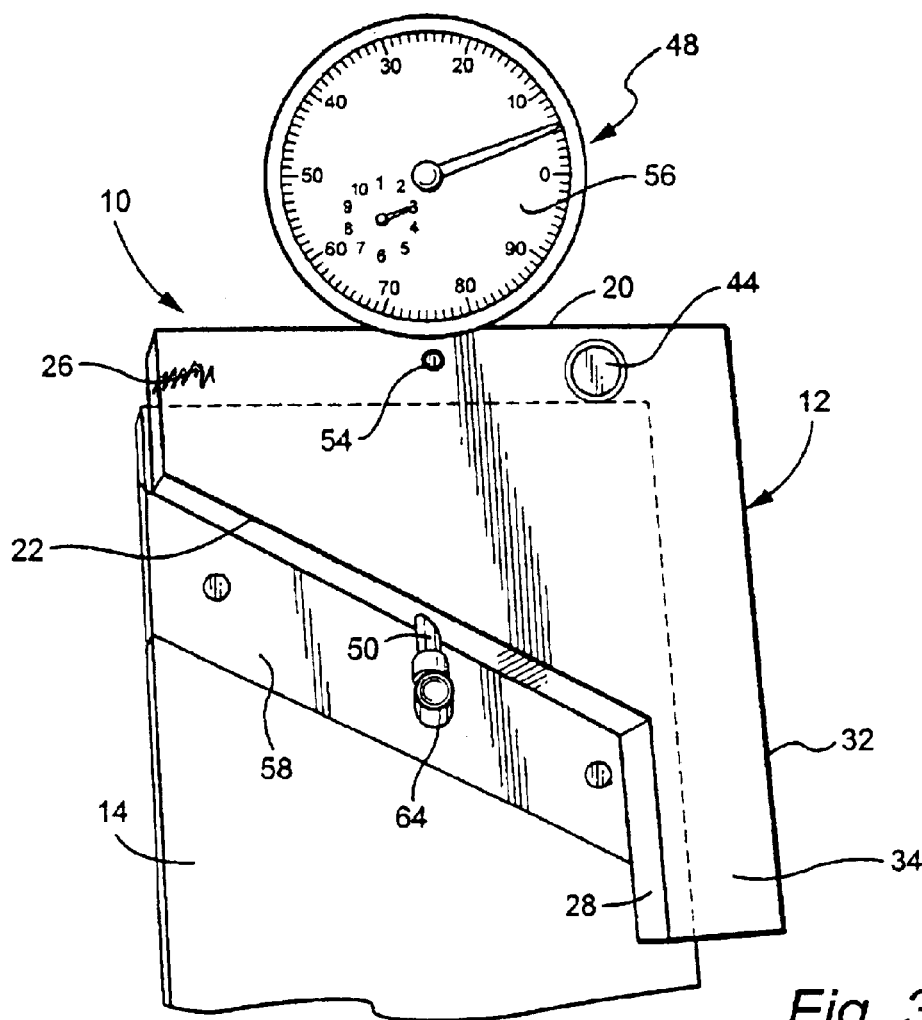
FIG. 3 is a perspective view of the gage assembly of FIG. 1 located on a blade segment.

The gage body 12 is thicker along the right side edge 32 as best seen in FIG. 2, thus establishing a flange 36 extending along the right edge 32, joined to the body of the gage via beveled surface 38 and undercut radius 40. The beveled surface 38 extends along and parallel to the right edge 32 of the gage body. The profile established by beveled surface 38 and the back face of the gage substantially matches the profile of the right side edge 30 and front face of the segment 14 such that the gage body 12 will accurately engage the segment 14 along surface 38 when located as shown in FIG. 3.

A hole 42 extends through the gage body 12, adjacent flange 36, and in proximity to the upper edge 20 and right side edge 32. In the exemplary embodiment, a dowel pin 44 (FIG. 4) is press fit in the hole 42 and projects from a back side of the gage body. Pin 44 is adapted to seat on the top or end edge 46 of segment 12 as best seen in FIG. 3 and as further described below. It will be appreciated that other suitable elements could serve the same purpose as pin 44.

A conventional dial indicator gage 48 is supported on the body 12, with the stem 50 of the indicator gage passing through a bore 52 and opening through the sloped surface 22. A set screw 54 (or other suitable means) holds the dial indicator 48 on the gage body 12 in the position shown in FIG. 4, with dial portion 56 of the indicator gage supported on the top edge 20 of the gage body 12.

An elongated, rectangular slide gage 58 (FIGS. 3 and 4) is dimensioned to fit snugly in the dovetail groove 18, the slide gage having beveled side edges 60, 62 that mate with the angled side edges of the dovetail groove 18. The slide gage is fitted with an element, e.g., a pin 64, that is centered on the slide gage such that it will lie on the longitudinal centerline of the dovetail groove 18, midway between the side edges 30, 31 of the segment 14, when installed in the dovetail groove, i.e., the pin will be located at point 16 (FIG. 14) in the groove 18.

In use, the dovetail groove 18 in the segment 14 is first cleaned and de-burred. Slide gage 58 is then inserted into the slot. The gage assembly 10 is then located on the segment, with dowel pin 44 engaged with the top or end edge 42 of the segment, and with beveled surface 38 engaged along the side edge 30 of the segment. Locating the gage assembly 10 as described will also insure that the left and right side edges of the slide gage 58 are also properly aligned. Thus, it is the beveled surface 38 and dowel pin 44 that provide the reference surfaces used to accurately position the gage assembly 10 on the segment 14. With the gage assembly 10 accurately located, the dial indicator gage stem 50 will engage the pin 64 in the slide gage 58. In this way, and with the dial indicator gage appropriately calibrated, the distance between the top or end edge 46 of the segment 14 and the center of the dovetail slot 18 will be indicated on the dial. This distance is then utilized as the reference dimension for milling all of the other dovetail grooves in the segment.

It will be appreciated that the exact configuration of the gage assembly and the various dimensional relationships between, for example, the pins 44 and 64, will vary for different compressors.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A gage assembly for measuring a distance (d) from an end edge of a blade segment to a center location of a groove formed in the blade segment comprising:
   a gage body having at least two reference surfaces adapted to engage edges of the blade segment;
   a dial indicator gage having a dial and a stem, the stem passing through a portion of the gage body; and
   a slide gage adapted for insertion into the groove formed in the blade segment, said slide gage fitted with an element that, in use, aligns with and is engaged by said stem of said dial indicator gage.

2. The gage assembly of claim 1 wherein one of said reference surfaces comprises a pin projecting from a back side of said gage body.

3. The gage assembly of claim 1 wherein said dial of said dial indicator is seated on a top edge of said gage body.

4. A gage assembly for measuring a distance (d) from an end edge of a blade segment to a center location of a groove formed in the blade segment comprising:
   a gage body having at least two reference surfaces adapted to engage edges of the segment;
   a dial indicator gage having a dial and a stem, the stem passing through a portion of the gage body; and
   a slide gage adapted for insertion into the groove, said slide gage fitted with an element that, in use, aligns with said stem of said dial indicator gage; wherein said slide gage is provided with beveled side edges, and wherein said element comprises a pin.

5. A gage assembly for measuring a distance (d) from an end edge of a blade segment to a center location of a groove formed in the blade segment comprising:
   a gage body having at least two reference surfaces adapted to engage edges of the segment;
   a dial indicator gage having a dial and a stem, the stem passing through a portion of the gage body; and
   a slide gage adapted for insertion into the groove, said slide gage fitted with an element that, in use, aligns with said stem of said dial indicator gage; wherein one of said reference surfaces comprises a pin projecting from a back side of said gage body; and further wherein the other of said reference surfaces comprises a beveled surface extending along a side edge of said gage body.

6. The gage assembly of claim 5 wherein said beveled surface is shaped to match a corresponding edge of the blade segment.

7. The gage assembly of claim 6 wherein said stem projects out a sloped edge formed on said gage body, said sloped edge corresponding to an edge of the angled dovetail groove.

8. A gage assembly for measuring a distance (d) from an edge of a blade segment to a center location of a groove formed in the blade segment comprising:
   a gage body having at least two reference surfaces adapted to engage edge surfaces of the segment and a sloped edge configured to match a corresponding angled edge of the groove;
   a dial indicator gage having a dial and a stem, the stem passing through a portion of the gage body and opening through said sloped edge; and
   a slide gage adapted for insertion into the groove, said slide gage fitted with an element that, in use, aligns with said stem of said dial indicator gage;
   wherein one of said reference surfaces comprises a pin, and the other of said reference surfaces comprises a beveled surface extending along a side edge of said gage body.

9. The gage assembly of claim 8 wherein said dial of said dial indicator gage is seated on a top edge of said gage body.

10. The gage assembly of claim 8 wherein said slide gage is provided with beveled side edges, and wherein said element comprises a pin.

* * * * *